United States Patent
Redeker et al.

(10) Patent No.: US 11,352,044 B2
(45) Date of Patent: Jun. 7, 2022

(54) STEERING DEVICE FOR A MOTOR VEHICLE, METHOD FOR OPERATING A STEERING DEVICE, CONTROL UNIT, AND MOTOR VEHICLE

(71) Applicant: AUDI AG, Ingolstadt (DE)

(72) Inventors: Immo Redeker, Ingolstadt (DE); Jacques Hélot, Ingolstadt (DE); Joris Mertens, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 216 days.

(21) Appl. No.: 16/633,450

(22) PCT Filed: Jul. 18, 2018

(86) PCT No.: PCT/EP2018/069541
§ 371 (c)(1),
(2) Date: Jan. 23, 2020

(87) PCT Pub. No.: WO2019/020465
PCT Pub. Date: Jan. 31, 2019

(65) Prior Publication Data
US 2020/0216110 A1    Jul. 9, 2020

(30) Foreign Application Priority Data
Jul. 24, 2017 (DE) .................. 10 2017 212 686.8

(51) Int. Cl.
*B62D 1/10* (2006.01)
*B60W 60/00* (2020.01)
(Continued)

(52) U.S. Cl.
CPC ............. *B62D 1/10* (2013.01); *B60K 35/00* (2013.01); *B60W 60/005* (2020.02);
(Continued)

(58) Field of Classification Search
CPC ....... B62D 1/10; B60W 60/005; B60K 35/00; B60K 2370/782; B60K 2370/67; B60K 2370/152; G05D 1/0061
See application file for complete search history.

(56) References Cited

U.S. PATENT DOCUMENTS
2016/0334876 A1* 11/2016 Park .................. G06F 3/04817

FOREIGN PATENT DOCUMENTS
CH         711641 A2 *  4/2017  ............ B60K 35/00
CN      105683021 A     6/2016
(Continued)

OTHER PUBLICATIONS

German Office Action dated May 24, 2018 from German Application No. 10 2017 212 686.8, 12 pages.
(Continued)

*Primary Examiner* — Vivek D Koppikar
*Assistant Examiner* — Jeffrey R Chalhoub
(74) *Attorney, Agent, or Firm* — Staas & Halsey LLP (57) ABSTRACT

A steering handle for a steering apparatus of a motor vehicle includes an end face which faces a user when the steering handle is in a position of use and a display element arranged on a side of the steering handle which faces away from the end face. A control device carries out a method by which a position of the steering handle is changed based on a driving mode set by a driver assistance device. The control device generates an adjustment signal to change between a position of use of the steering handle and a position of rest of the steering handle. When the steering handle is in a position of rest, a surface of the steering handle which faces away from the user when the steering handle is in the position of use instead faces the user.

19 Claims, 2 Drawing Sheets

(51) Int. Cl.
   *B60K 35/00* (2006.01)
   *G05D 1/00* (2006.01)
(52) U.S. Cl.
   CPC .... *B60K 2370/152* (2019.05); *B60K 2370/67* (2019.05); *B60K 2370/782* (2019.05); *G05D 1/0061* (2013.01)

(56) References Cited

FOREIGN PATENT DOCUMENTS

| CN | 105683021 | A | * | 6/2016 | ............ B60W 50/08 |
|---|---|---|---|---|---|
| CN | 110997450 | A | | 4/2020 | |
| DE | 10 2006 006 995 | A1 | | 8/2007 | |
| DE | 10 2012 011 882 | | | 9/2013 | |
| DE | 10 2013 110 865 | A1 | | 4/2015 | |
| DE | 10 2015 207 474 | A1 | | 10/2016 | |
| DE | 10 2015 207 477 | A1 | | 10/2016 | |
| DE | 10 2015 220 526 | A1 | | 4/2017 | |
| DE | 10 2016 011 461 | A1 | | 4/2017 | |
| DE | 10 2017 212 686.8 | | | 7/2017 | |
| DE | 10 2018 211 852 | A1 | | 1/2020 | |
| JP | 2887652 | B2 | * | 4/1999 | |
| JP | 2004-210209 | | | 7/2004 | |
| KR | 10-2019-0023775 | | | 3/2019 | |
| TW | 200642888 | A | | 12/2006 | |
| TW | 200642888 | A | * | 12/2006 | ............... B62D 1/04 |
| WO | 03/020571 | A1 | | 3/2003 | |
| WO | 2017/060149 | A1 | | 4/2017 | |
| WO | 2018/060443 | A1 | | 4/2018 | |
| WO | PCT/EP2018/069541 | | | 7/2018 | |
| WO | 2020/016630 | A1 | | 1/2020 | |

OTHER PUBLICATIONS

International Search Report dated Nov. 2, 2018 from International Application No. PCT/EP2018/069541, 5 pages.
English Translation by WIPO dated Feb. 6, 2020 of the International Preliminary Report on Patentability from International Patent Application No. PCT/EP2018/069541.
Chinese Office Action from Chinese Application No. 201880049217.8 dated Aug. 31, 2021 (nine pages).

* cited by examiner

STEERING DEVICE FOR A MOTOR VEHICLE, METHOD FOR OPERATING A STEERING DEVICE, CONTROL UNIT, AND MOTOR VEHICLE

CROSS REFERENCE TO RELATED APPLICATIONS

This application is a U.S. national stage of International Application No. PCT/EP2018/069541 filed on Jul. 18, 2018. The International Application claims the priority benefit of German Application No. 10 2017 212 686.8 filed on Jul. 24, 2017. Both the International Application and the German Application are incorporated by reference herein in their entirety.

BACKGROUND

Described herein is a steering apparatus for a motor vehicle and to a method for operating a steering apparatus of a motor vehicle. The steering apparatus has a steering handle, for example a steering wheel, and an adjustment device for changing between a position of use of the steering handle and a position of rest of the steering handle. The steering handle can, for example, assume the position of rest during a piloted driving mode. In this case, the position of use can also be referred to as a usage position or standby position or operating position and the position of rest can be referred to as a resting position.

Modern motor vehicles which can be operated only in a piloted driving mode no longer require a steering handle and this results in the advantage that there is more space for each occupant in the interior of the motor vehicle. However, purely piloted driving, which can also be referred to as autonomous driving, is at least to date not yet comprehensively possible, which is why use may be made in practice of those motor vehicles which can be operated both in a piloted driving mode and in a partially autonomous or manual mode. In a partially autonomous driving mode, for example a manual driving mode, one of the occupants, the driver, undertakes the steering and requires a steering apparatus for this purpose. In this case, a device or a combination of components for influencing the lateral control of the motor vehicle is understood as meaning a steering apparatus.

Manual control of the motor vehicle, which can also be referred to as analog or active control, will attract less attention in future under certain circumstances, which is why it becomes important to configure the interior without a known steering wheel when driving in an autonomous driving mode. In many motor vehicles, differences between a piloted driving mode and an at least partially manual driving mode are given little or no attention geometrically, that is to say the driver is also restricted in his freedom of movement in the piloted driving mode. In this case, the steering handle is statically installed in known motor vehicles. Such static installation spaces are therefore kept available even though they are not required in the piloted driving mode. Space in the interior is wasted as a result since the steering handle is also very prominent in the piloted driving mode. Since the steering handle is always available close at hand, the user must under certain circumstances find out, via an on-board system, whether the piloted driving mode is still switched on.

German Patent Application 10 2015 207 477 A1 describes an arrangement of a steering wheel in a motor vehicle suitable for autonomous driving, wherein the steering wheel has been pivoted from a position of use into a position of rest in which the driver of the vehicle can still specify a steering desire by use of the steering wheel, and wherein pivoting of the steering wheel from the position of use into the position of rest switches on an autonomous vehicle operating mode in which the vehicle moves along the road without the assistance of the driver.

In a similar manner, German Patent Application 10 2013 110 865 A1 describes a method for a driver assistance system of a vehicle, wherein the steering wheel can be manually adjusted between a first position and a second position. A position of the steering wheel is captured and the driver assistance system is set depending on the position of the steering wheel.

German Patent Application 10 2006 006 995 A1 describes a motor vehicle having a steering wheel and an autopilot system which can be switched on and off, wherein, depending on the operating state of the autopilot system, the steering wheel can be automatically adjusted between a geometrically small form when the autopilot system is switched on and a geometrically large form when the autopilot system is switched off. However, this results in only a very slight change in the available space, and the user of the motor vehicle does not have any comfort advantage in a piloted driving mode since the steering handle still projects into his seating region.

SUMMARY

In the case of a steering handle in which not only the grips but rather the entire steering handle is/are adjusted, the advantage arises that the driver has more space on his seat. However, the disadvantage here is that the pivoted steering handle in the position of rest conceals a region of the dashboard, with the result that a screen of the dashboard can no longer be used, for example, even though the user, especially in the piloted driving mode, would like to have the possibility of writing emails or watching a film, for example, during the journey with the aid of an information system of the motor vehicle.

Described herein are various ways to improve the possibilities of using an information system of a motor vehicle which is driving in the piloted driving mode.

The disclosure is based on the idea of adjusting the steering handle on the basis of a current driving mode. The steering apparatus described herein also has a display element on a surface of the steering handle facing away from a user in the position of use of the steering handle. In other words, in a manual or partially autonomous driving mode in which the steering handle is in a position of use, the user cannot see and/or cannot use the display element and, after activating a piloted driving mode and after adjusting the steering handle into a position of rest or a resting position in which the display element faces the user, the user can use the display element. A novel appearance advantageously arises in the interior of the motor vehicle as well as a new installation space division and installation space distribution. The steering apparatus is an innovative solution for providing more space in the interior. In addition to a novel differentiation potential with respect to competitors of the motor vehicle manufacturer, driving safety is also increased because the steering handle can no longer be inadvertently gripped and used by the user in the piloted driving mode and the piloted driving mode is therefore not inadvertently aborted.

The steering apparatus described herein for a motor vehicle has a steering handle, for example a steering wheel or a control lever, having an end face, wherein the end face faces a user in a position of use of the steering handle.

In a state installed in the motor vehicle, the steering handle is ready for operation in the position of use and is arranged to receive an operating action for steering the motor vehicle by the user. In the position of rest or resting position, the steering handle is arranged in such a manner that that surface of the steering handle which faces away from the end face faces the user.

The steering apparatus may include a display element, wherein a display element is understood as meaning a component having a display area, that is to say a screen, for example. The display element of the steering apparatus described herein is arranged on a side of the steering handle facing away from the end face, for example on an underside of the steering handle. As a result, the display element of the steering handle installed in the motor vehicle is arranged on a surface of the steering handle facing away from the user of the steering handle in the position of use.

The advantages described above arise. In addition to an already existing display element of the motor vehicle, which is not arranged on the steering handle, for example a screen of the combination instrument which may be arranged in a center console or in an instrument panel, the display element of the steering handle may display additional information or an entertainment program, for example. If the steering handle is used in a piloted driving mode in which the steering handle is not needed to steer the motor vehicle, the user can therefore use the steering handle for entertainment. A screen which may be concealed by the position of rest of the steering handle is also replaced, for example.

In this case, a pivot axis, about which the steering handle can be pivoted, that is to say can be rotated or tilted for example, can, for example, intersect a motor vehicle vertical axis and can run in a plane which is formed by a motor vehicle longitudinal axis and a motor vehicle transverse axis.

The steering apparatus can, for example, have an operating element which is arranged on the steering handle and is intended to receive an operating action of the user, wherein the operating action may be for changing a driving mode of the motor vehicle by use of a driver assistance device. A driver assistance device is understood as meaning a device or a device component for operating the motor vehicle in different driving modes and can be in the form of a driver assistance system, for example. An operating element arranged in this manner is in a thematic context with respect to the transmission of the steering task to the driver assistance device, which is why the user can operate the driver assistance device in a more intuitive manner and can pay more attention to the current driving process.

The steering apparatus may, for example, have an adjustment device, wherein an adjustment device is understood as meaning a device or a device component for adjusting another component or another group of components. The adjustment device is set up to change between a position of use of the steering handle and a position of rest of the steering handle by pivoting the steering handle.

Aspects of the disclosure are achieved, while achieving the advantages which have already been mentioned, by use of a method for operating the steering apparatus according to one of the described embodiments of the steering apparatus, wherein the method has the following operations which are carried out by a control device. In this case, a control device is understood as meaning a device or a device component for receiving and evaluating signals and for generating control signals. The control device may be in the form of a control unit or a control board, for example.

An operating signal is first of all received from an operating device, that is to say from a device or a device component for receiving operating actions and for generating a respective operating signal which describes the operating action and/or a function to be triggered by the operating action. The operating device may have, for example, a component for directly receiving the operating action, for example the operating element which has already been mentioned above and can be in the form of a pushbutton or a touch-sensitive surface of a screen, for example.

A control signal which describes a driving mode to be set by the driver assistance device is generated depending on the received operating signal. This is followed by transmitting the generated control signal to the driver assistance device and thereby setting the driving mode described by the control signal.

An adjustment signal which describes a change between the position of use of the steering handle and the position of rest of the steering handle by pivoting the steering handle is generated, wherein the steering handle in the position of use is arranged in a manner ready for operation for the purpose of receiving an operating action for steering the motor vehicle by the user, and wherein the steering handle is arranged in the position of rest in such a manner that a surface of the steering handle facing away from the user in the position of use faces the user. This is followed by transmitting the adjustment signal to the adjustment device.

The advantages which have already been mentioned above arise. In the position of use, that is to say, for example, in the partially autonomous or manual driving mode, the display element is not available, that is to say the display element of the steering handle cannot distract the user, with the result that the latter can concentrate better on the driving process. In the position of rest of the steering handle, that is to say if the user does not have to concentrate on the steering anyway, the user can use the display element.

If the driving mode described by the generated control signal and set by the driver assistance device is a piloted driving mode, the generated control signal can, for example, describe a change of the steering handle from the position of use into the position of rest. If the driving mode which has been set is an only partially autonomous driving mode or a manual driving mode, the generated control signal can describe a change of the steering handle from the position of rest into the position of use. In a driving mode in which the user needs the steering handle, the steering handle is advantageously available in a manner ready for use and, in the piloted mode in which the steering handle is not required, it takes up less space in the seating region of the user.

According to an example embodiment of the method described herein, the change between the position of use and the position of rest, as described by the adjustment signal, can involve pivoting, that is to say, for example, folding up or rotating, the steering handle along a pivot axis which intersects a motor vehicle longitudinal axis and a motor vehicle vertical axis and can, for example, run in a plane formed by the motor vehicle longitudinal axis and the motor vehicle transverse axis. In this case, the pivot axis can, for example, run parallel to the motor vehicle transverse axis or substantially parallel to the motor vehicle transverse axis. As a result, the steering handle in the position of rest can be stored in a space-saving manner and the display element can be used by the user, for example, if the steering handle is a steering handle having a display element described further above.

As a further measure for providing use of the display element only when the user does not have to steer, the control device can generate a display signal for activating the display element of the steering handle on the basis of the driving mode which has been set, for example, if the piloted driving mode is set. This is followed by transmitting the generated display signal to a display device of the motor vehicle or to the display element. A display device is understood as meaning a device or a device component for displaying display contents, that is to say images for example, which can be included in the display element.

Aspects of the disclosure are achieved by use of a control device which is set up to carry out a method according to one of the above-described embodiments of the method described herein. The control device may be in the form of a control unit or a control board, for example. The control device can, for example, have a processor device, that is to say a device or component for electronic data processing. The optional processor device can have, for example, at least one microprocessor and/or at least one microcontroller. The processor device can be set up to execute a program code which can be stored in a data memory and can be set up to cause the control device to carry out the method described herein when executed by the processor device.

According to another embodiment of the steering apparatus described herein, this may have an embodiment of the control device described herein.

Aspects of the disclosure are achieved by use of a motor vehicle which includes an embodiment of the steering apparatus described herein. The motor vehicle can, for example, be in the form of an automobile, for example in the form of a passenger vehicle.

The display element in a position of use of the steering handle is arranged on a surface of the steering handle facing away from a user. A display device of the motor vehicle can, for example, have the described display element and at least one further display element which can be at least partially concealed by the steering handle in the position of use of the steering handle and can be accessible to the user in the position of rest of the steering handle. In this case, the further display element can, for example, be arranged at a position of an interior trim element of the motor vehicle which can be at least partially concealed by the steering handle in the position of use of the steering handle.

Such a further display element can be arranged, for example, in a lower region of a dashboard which can be at least partially concealed by the steering handle in the manual mode. As a result, even more display possibilities are made available to the user in the piloted driving mode and can be used by the user to look at a panoramic image or for a videoconference, for example. If the steering handle is in the position of use, such an additional display element is at least partially concealed and cannot be used by the user in the manual or partially autonomous driving mode, thus increasing driving safety. The advantages already mentioned above also arise.

The motor vehicle can, for example, have an adjustment device for changing between a position of use of the steering handle and a position of rest of the steering handle by pivoting the steering handle. The advantages already mentioned also arise here.

BRIEF DESCRIPTION OF THE DRAWINGS

These and other aspects and advantages will become more apparent and more readily appreciated from the following description of the example embodiments described below, in which.

DETAILED DESCRIPTION

Reference will now be made in detail to examples which are illustrated in the accompanying drawings.

The exemplary embodiments explained below are examples of the disclosure. In the exemplary embodiments, the described components of the embodiments are each individual features which can be considered independently of one another and each also develop the disclosure independently of one another and can therefore also be considered to be part of the disclosure individually or in a combination other than the combination shown. Furthermore, the embodiments described can also be supplemented with further features of the already described features.

In the drawings, functionally identical elements are each provided with the same reference signs.

Figure 1:
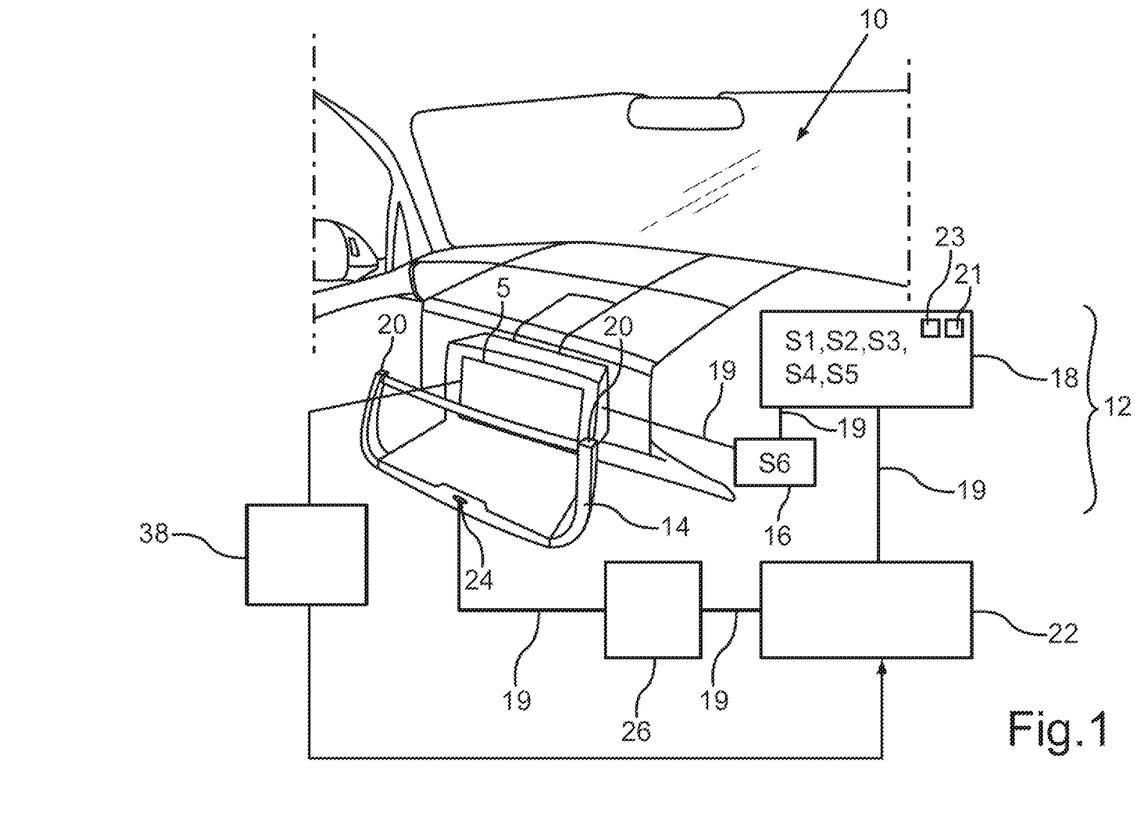
FIG. 1 is a schematic illustration of an embodiment of the method described herein and an embodiment of the steering apparatus described herein.
Figure 2:
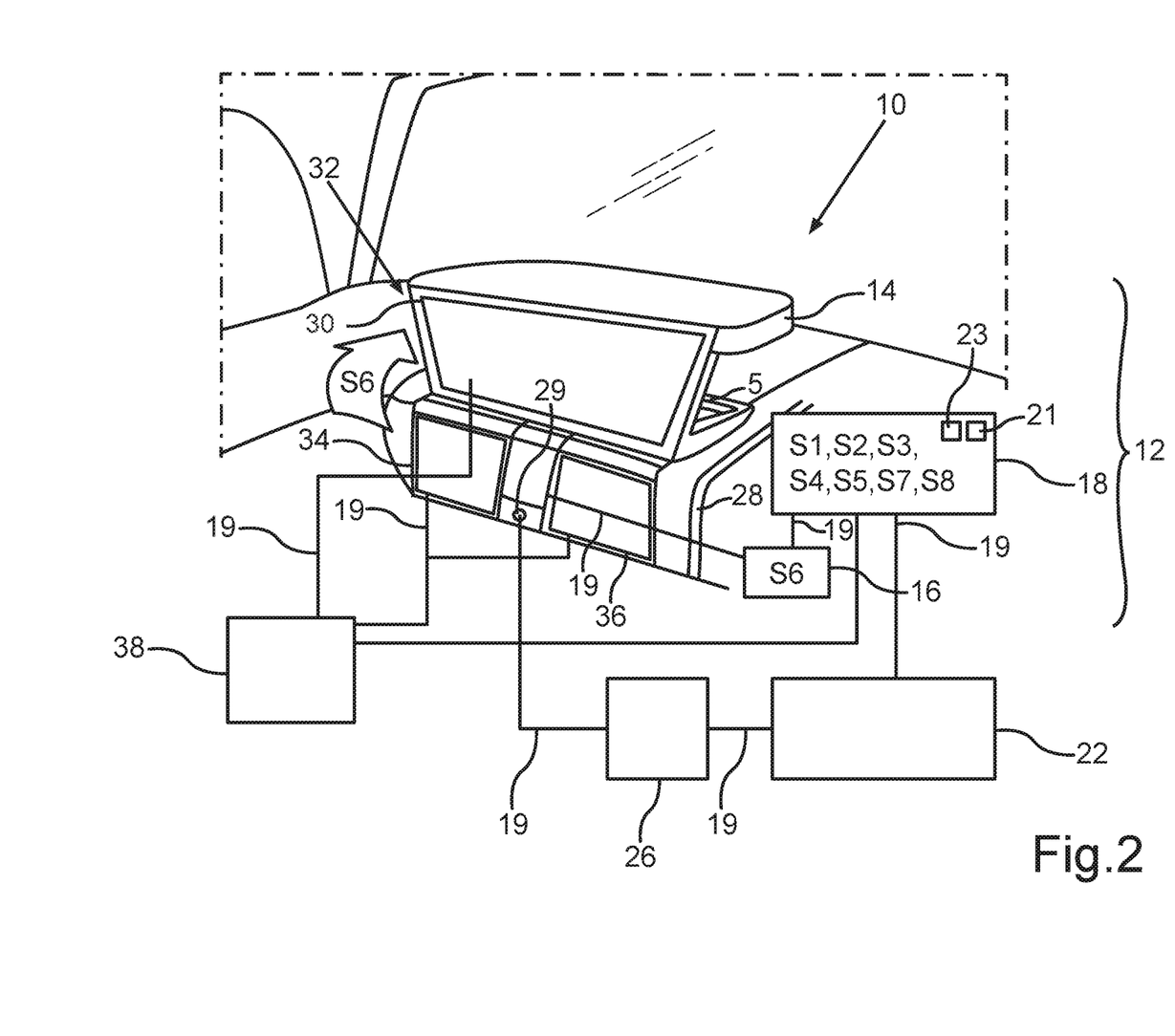
FIG. 2 is a further schematic illustration of the embodiment of the method described herein and the embodiment of the steering apparatus described herein.

FIG. 1 and FIG. 2 show an exemplary embodiment of the method described herein, on the basis of which the principle of the method described herein is explained. In this respect, the drawings show a motor vehicle 10 which can be in the form of a passenger vehicle, for example.

The motor vehicle 10 has a steering apparatus 12, wherein the steering apparatus 12 can have a steering handle 14 and, in the examples in FIG. 1 and FIG. 2, optionally an adjustment device 16 and optionally a control device 18. The steering apparatus 12 can optionally additionally have, for example, a steering gear, a steering column and a tie rod which, however, are not shown in the drawings for reasons of clarity. The steering apparatus 12 can, for example, be in the form of a steer-by-wire steering system in this case.

The steering handle 14 can, for example, be in the form of a steering wheel. The steering handle 14 in the drawings can include two grips 20, for example. FIG. 1 shows an exemplary optional display element 5 which can be visible in the position of use of the steering handle 14 and can be arranged, for example, as shown in FIG. 1, on an end face of the steering handle 14. The user can read parameters indicated by a combination instrument, for example a speed or a rotational speed, on this display element 5 during the journey, for example.

The adjustment device 16 may have, for example, a motor for adjusting the steering handle 14, for which purpose the steering handle 14 can be shifted along a rail, for example, or can be folded up or rotated, for example via a hinge or a cable pull.

Alternatively or additionally, the steering handle 14 can be pivoted or rotated on a double axis in each case along a guide, wherein each of the guides can be arranged, for example, on one side of the hinge of the steering handle 14.

In the example in FIG. 1 and FIG. 2, a data communication connection 19 of the adjustment device 16 to a hinge, for example, is shown in this case, by use of which the adjustment signal or an electrical pulse can be transmitted.

The control device 18 may be in the form of a control chip or a control board with a circuit, for example, and may be connected to the adjustment device 16 using a data communication connection 19. Such a data communication connection 19 may be, for example, a wireless data communication connection, for example a WLAN or Bluetooth connection, or a wired data communication connection, for example a data bus of a data bus system of the motor vehicle 10.

The control device 18 can optionally be a control unit of the motor vehicle 10. The control device 18 from the example in the drawings has an optional processor device 23 and an optional data memory 21. A program code for carrying out the method described herein, for example, can be stored in the data memory 21, for example a memory chip or a memory card.

FIG. 1 and FIG. 2 additionally show an optional driver assistance device 22 which may be in the form of an on-board system or a driver assistance system of the motor vehicle 10, for example. In the example in FIG. 1, the steering handle 14 can optionally have an operating element 24 which can be connected to the operating device 26 of the motor vehicle, for example.

Such an operating device 26 of the motor vehicle 10 may be, for example, a user interface of the motor vehicle 10, and the exemplary operating element 24 in FIG. 1 may include, for example, a keyboard for triggering a piloted driving mode. For example, the driver assistance device 22 can set the piloted driving mode by virtue of the operating element 24 being pressed or touched.

FIG. 2 shows a further, optional operating element 29 which may be arranged, for example, on an interior trim element 28 of the motor vehicle 10, for example, at a position or location of the interior trim element 28 where the further, optional operating element 29 can be seen or can be operated well only in a folded-up state of the steering handle 14. The further, optional operating element 29 can be programmed, for example, to change from the piloted driving mode into a manual or partially autonomous driving mode.

FIG. 2 shows a first display element 30 which can be arranged, for example, on an underside 32 of the steering handle 14 and, for this purpose, can be sewn, for example, into a sheath or cover of the steering handle 14 or can be adhesively bonded to the steering handle 14. The display element 30 may be, for example, in the form of a touch-sensitive screen or, for example, in the form of an LCD screen or OLED screen or a non-reflective OLED screen. Optionally, a region of the interior trim element 28 which is concealed by the steering handle 14 can optionally have yet further display elements 34, 36 in an analog driving mode, that is to say in a manual or partially autonomous driving mode. In this case, they may each be a screen known to a person skilled in the art, for example.

In this case, the display element 30, which can also be referred to as a display area for example, may be, for example, a very high-quality screen and can optionally be coupled to the further, optional display elements 34, 36.

The display elements 30, 34, 36 may be, for example, components of a display device 38 of the motor vehicle 10, wherein the display device 38 may have, for example, a control board for coordinating the display elements 30, 34, 36, which control board can be arranged in a center console of the motor vehicle 10, for example.

The corresponding data communication connections 19 for controlling the display elements 30, 34, 36 may be mounted, for example, in the interior trim element 28, and the data communication connection 19 for the display element 30 of the steering handle 14 may be guided, for example, through a channel or another type of recess through the exemplary hinge of the steering apparatus 12.

The display element 30 and/or the further, optional display elements 34, 36 may be optionally used for a video chat with occupants of another motor vehicle or to look at a panoramic image. The further, optional display elements 34, 36 may provide a further plane for displaying display contents.

FIG. 1 showed the steering handle 14 in a position of use or usage position, for example if the motor vehicle 10 is driving in an analog driving mode, that is to say in a manual driving mode, or in a partially autonomous driving mode. The user controls the motor vehicle 10 by use of the steering handle 14 which can also be referred to as a steering unit.

In a first method operation S1 (FIG. 1), the control device 18 receives an operating signal from the operating device 26, which operating signal can describe, for example, an operating action received by the operating element 24, exemplary pressing on the operating element 24. Provision may be made for activation of a piloted driving mode to be assigned to this operating action. In method operation S2, the control device 18 then generates a control signal which describes the driving mode to be set, the exemplary piloted driving mode, and transmits the generated control signal to the driver assistance system 22 via the exemplary data bus (S3).

Optionally, provision may be made, for example, for the triggering of this change of the driving mode to cause the user to press on the operating element 24, for example for 5 seconds.

For example, as soon as the piloted driving mode has been set by the driver assistance device 22, the control device 18 generates an adjustment signal (S4) which describes the change to the position of rest of the steering handle 14 illustrated in FIG. 2. In method operation S5, the generated adjustment signal is transmitted to the adjustment device 16. The pivoting (S6) to be carried out by the adjustment device 16 may be, for example, folding up or folding down or rotating the steering handle 14, for example along a pivot axis which can run, for example, parallel or approximately parallel to a motor vehicle transverse axis. In this case, the steering handle 14 can, for example, be folded up through 90°, for example.

FIG. 2 shows the steering handle 14 which has been folded up and the underside 32 of which now faces the user who can now look at the display element 30.

The user can now use both the display element 30 and the other display elements 34, 36 in the piloted driving mode.

Provision may be optionally made for the control device 18 to generate a display signal (S7), for example after the piloted driving mode has been set, which display signal describes activation of the display element 30, and for the control device to then transmit this display signal to the display device 38 in method operation S8 (S8). This display signal can provide for electronic and/or electrical activation of the display elements 30, 34, 36, for example.

As a result of the fact that the steering handle 14 is now in the position of rest and occupies less sitting space, the user of the motor vehicle 10 can sit down differently, for example, without being restricted in his freedom of movement by the steering handle 14. In addition, the user has received clearly visible feedback with respect to the process of setting the piloted driving mode which has been carried out, that is to say it is visible to him, from the position of rest of the steering handle 14, that the motor vehicle 10 is driving in a piloted manner.

If the user would like to change to the manual driving mode again, for example after a while, the user can operate the operating element 29 released by the position of rest of the steering handle 14, and this operating signal can be received, as already described above, from the operating device by the control device 18 (S1). The control device 18 generates a further control signal for setting the desired manual driving mode (S2), transmits the generated control signal to the driver assistance device 22 (S3) and generates an adjustment signal (S4) for pivoting the steering handle 14 from the position of rest back into the position of use. The steering handle 14 is then available to the user again, and the display elements 30, 34, 36 are again facing away and are also deactivated again, for example.

Overall, the exemplary embodiment illustrates how, for example, a rotating active and/or autonomous steering unit, that is to say an active and/or autonomous steering handle 14, having a display element 30 arranged on the surface facing away from the end face, for example a display on the underside or a "main screen", is provided by the disclosure, for example, in a piloted driving mode.

According to a further exemplary embodiment, the steering handle 14, which can alternatively be referred to as a "control unit", can include or have, for example on the underside, a spacious high-resolution display medium as the display element 30 which can, for example, be rotated upward, for example, as a result of the activation of the autonomous or piloted driving mode. The display element 30 can be, for example, electrically and/or mechanically pivoted, that is to say rotated for example. In other words, the steering handle 14 pivots and/or rotates upward, for example, in the exemplary autonomous driving mode.

A driver, that is to say a person who is now being driven, thus has not only the required steering handle 14, that is to say the required steering wheel for example, from his field of view and can now enjoy, for example, an entertainment program on the display element 30 which may be in the form of a high-resolution display, for example.

As a result of the exemplary rotation of the steering unit, an additional display medium, that is to say an additional display element 34, or a plurality of display elements 34, 36 can be optionally provided. In addition to the advantages which have already been mentioned above, this results in a novel staging for the driver/person being driven.

According to a further exemplary embodiment, the user can carry out control via the steering unit, that is to say by use of the steering handle 14, for example in an analog or manual mode (see FIG. 1), and the operating element 24 which can be arranged, for example, as a button in the center of the exemplary steering unit can trigger the autonomous driving mode, for example, and can fold up the steering handle 14.

In a piloted driving mode (see FIG. 2), the exemplary steering unit of the display element 30, which may be in the form, for example, of a large media field on an underside of the exemplary steering unit, can be released. As a result of the exemplary rotation, additional, optional operating and/or display fields can also be released, that is to say additional, optional display elements 34, 36. The operating element 29 which may be in the form of a button, for example, can be arranged in the center, for example in the center of the interior trim element 28 and can trigger the active, analog driving mode, that is to say the manual driving mode, and the exemplary steering wheel can be moved down again.

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A steering apparatus for a motor vehicle, the steering apparatus comprising:
   a steering handle having an end face to face a user when the steering handle is in a position of use and to face away from the user when the steering handle is in a position of rest; and
   a display element disposed on a surface of the steering handle so as to face away from the user when the steering handle is in the position of use and the end face of the steering handle faces the user, and so as to face the user when the steering handle is in the position of rest and the end face of the of the steering handle faces away from the user.

2. The steering apparatus according to claim 1, further comprising:
   an operating element, disposed on the steering handle, configured to receive an operating action of the user to change a driving mode by using a driver assistance device.

3. The steering apparatus according to claim 1, further comprising:
   an adjustment device to change the steering handle between the position of use and the position of rest, by pivoting the steering handle,
   wherein the display element is disposed on an underside of the steering handle such that the display element is not visible to the user, when the end face of the steering handle faces the user and the steering handle is in the position of use.

4. The steering apparatus according to claim 1, further comprising:
   at least one memory to store at least one instruction; and
   at least one processor to execute the at least one instruction stored in the at least one memory to:
      transmit a control signal to a driver assistance device to set a driving mode of the motor vehicle according to an input received via the user, and
      transmit, according to the set driving mode, an adjustment signal to an adjustment device to position the steering handle to one of the position of use and the position of rest.

5. A method for operating a steering apparatus of a motor vehicle, the method comprising:
   receiving, by a controller, an operating signal from an operating device;
   generating, by the controller, a control signal to set a driving mode based on the operating signal received by the controller;
   transmitting, by the controller, the control signal generated by the controller to a driver assistance device to set the driving mode;
   generating, by the controller according to the set driving mode, an adjustment signal to position a steering handle to one of a position of use and a position of rest, by pivoting the steering handle, the steering handle in the position of use being arranged in a manner ready for operation by a user of the motor vehicle to steer the motor vehicle using a grip of the steering handle and the steering handle having a surface on which a display element is disposed which faces away from the user, and the steering handle in the position of rest being arranged such that the surface of the steering handle on which the display element is disposed faces the user and the grip of the steering handle faces away from the user; and transmitting, by the controller, the adjustment signal generated by the controller to the adjustment device to position the steering handle to one of the position of use and the position of rest.

6. The method according to claim 5, wherein positioning the steering handle to one of the position of use and the position of rest according to the adjustment signal generated by the controller includes rotating the steering handle about a pivot axis which intersects a motor vehicle longitudinal axis and a motor vehicle vertical axis.

7. The method according to claim 5, further comprising:
generating, by the controller, a display signal to activate the display element based on the set driving mode; and
transmitting, by the controller, the display signal generated by the controller to a display device of the motor vehicle or to the display element.

8. A controller for a motor vehicle, the controller comprising:
at least one memory to store at least one instruction; and
at least one processor to execute the at least one instruction stored in the at least one memory to:
generate and transmit a control signal to a driver assistance device to set a driving mode of the motor vehicle according to an input received via a user of the motor vehicle, and
generate and transmit, according to the set driving mode, an adjustment signal to an adjustment device to position a steering handle of the motor vehicle to one of a position of use and a position of rest, the steering handle in the position of use being arranged in a manner ready for operation by the user to steer the motor vehicle using a grip of the steering handle and the steering handle having a surface on which a display element is disposed which faces away from the user, and the steering handle in the position of rest being arranged such that the surface of the steering handle on which the display element is disposed faces the user and the grip of the steering handle faces away from the user.

9. The controller according to claim 8, wherein
the at least one processor is further configured to generate and transmit a display signal to activate the display element based on the set driving mode.

10. A motor vehicle, comprising:
a steering apparatus including,
a steering handle having an end face to face a user when the steering handle is in a position of use and to face away from the user when the steering handle is in a position of rest; and
a display element disposed on a surface of the steering handle so as to face away from the user when the steering handle is in the position of use and the end face of the steering handle faces the user, and so as to face the user when the steering handle is in the position of rest and the end face of the of the steering handle faces away from the user.

11. The motor vehicle according to claim 10, wherein the display element is disposed on an underside of the steering handle such that the display element is not visible to the user, when the end face of the of the steering handle faces the user and the steering handle is in the position of use.

12. The motor vehicle according to claim 11, wherein
the steering handle is pivotable to change the steering handle between the position of use and the position of rest.

13. The motor vehicle according to claim 11, wherein
the steering handle is automatically pivotable to change the steering handle between the position of use and the position of rest, according to an input received via the user which selects a driving mode of the motor vehicle.

14. The motor vehicle according to claim 13, wherein
when the input received via the user selects a manual or partially autonomous driving mode of the motor vehicle, the steering handle is positioned in the position of use, and
when the input received via the user selects an autonomous driving mode of the motor vehicle, the steering handle is positioned in the position of rest.

15. The motor vehicle according to claim 10, further comprising:
a display device including at least one further display element which is at least partially concealed by the steering handle when the steering handle is in the position of use and which is accessible to the user when the steering handle is in the position of rest.

16. The motor vehicle according to claim 10, further comprising:
an adjustment device to change the steering handle between the position of use and the position of rest, by pivoting the steering handle.

17. The steering apparatus according to claim 1, wherein the display element is disposed on an underside of the steering handle such that the display element faces in a downward vertical direction, when the end face of the of the steering handle faces the user and the steering handle is in the position of use.

18. The steering apparatus according to claim 1, further comprising:
an adjustment device to change the steering handle between the position of use and the position of rest, by rotating the steering handle about an axis which is perpendicular to a longitudinal axis of the motor vehicle and a vertical axis of the motor vehicle.

19. The motor vehicle according to claim 10, wherein
at least one processor is configured to execute at least one instruction stored in at least one memory to:
in response to receiving an input indicating a selection of an autonomous driving mode of the motor vehicle, control an adjustment device to rotate the steering handle to position the steering handle in the position of rest, and
in response to receiving the input indicating the selection of the autonomous driving mode of the motor vehicle, activate the display element by transmitting a display signal to the display element.

* * * * *

UNITED STATES PATENT AND TRADEMARK OFFICE
CERTIFICATE OF CORRECTION

| | | |
|---|---|---|
| PATENT NO. | : 11,352,044 B2 | Page 1 of 1 |
| APPLICATION NO. | : 16/633450 | |
| DATED | : June 7, 2022 | |
| INVENTOR(S) | : Immo Redeker et al. | |

It is certified that error appears in the above-identified patent and that said Letters Patent is hereby corrected as shown below:

In the Claims

Column 10, Line 14:
In Claim 1, delete "of the of the" and insert --of the--.

Column 11, Line 55:
In Claim 10, delete "of the of the" and insert --of the--.

Column 12, Line 2:
In Claim 11, delete "of the of the" and insert --of the--.

Column 12, Line 36:
In Claim 17, delete "of the of the" and insert --of the--.

Signed and Sealed this
Sixth Day of September, 2022

Katherine Kelly Vidal
*Director of the United States Patent and Trademark Office*